US008820649B2

(12) United States Patent
Goldman et al.

(10) Patent No.: US 8,820,649 B2
(45) Date of Patent: Sep. 2, 2014

(54) ELECTRONIC CARD WITH A PROGRAMMABLE MAGNETIC STRIPE

(71) Applicant: Omne Mobile Payments LLC, Los Angeles, CA (US)

(72) Inventors: Jordan Chandler Goldman, Los Angeles, CA (US); Daniel Anthony Auten, Agoura Hills, CA (US); Carlos Pizarro Leon, Ovalle (CL)

(73) Assignee: Omne Mobile Payments, Inc., Los Angeles, CA (US)

( * ) Notice: Subject to any disclaimer, the term of this patent is extended or adjusted under 35 U.S.C. 154(b) by 0 days.

(21) Appl. No.: 14/022,123

(22) Filed: Sep. 9, 2013

(65) Prior Publication Data
US 2014/0138447 A1    May 22, 2014

Related U.S. Application Data

(60) Provisional application No. 61/728,741, filed on Nov. 20, 2012.

(51) Int. Cl.
*G06K 19/06* (2006.01)
(52) U.S. Cl.
CPC .............................. *G06K 19/06206* (2013.01)
USPC .......................................... 235/492; 235/493
(58) Field of Classification Search
USPC .......................................... 235/492, 493, 449
See application file for complete search history.

(56) References Cited

U.S. PATENT DOCUMENTS

| 8,256,667 | B2* | 9/2012 | Poznansky et al. | ............ 235/380 |
| 8,360,332 | B2* | 1/2013 | Poidomani et al. | ............ 235/492 |
| 8,590,796 | B1* | 11/2013 | Cloutier et al. | ............... 235/488 |
| 2009/0159689 | A1 | 6/2009 | Mullen et al. | |
| 2011/0218911 | A1 | 9/2011 | Spodak | |
| 2011/0320314 | A1 | 12/2011 | Brown | |
| 2012/0052800 | A1 | 3/2012 | Bona et al. | |
| 2012/0265685 | A1 | 10/2012 | Brudnicki et al. | |
| 2013/0320081 | A1* | 12/2013 | Olson et al. | .................... 235/380 |

OTHER PUBLICATIONS

BWOne. Credit Card 2.0 Powered Cards by Dynamics Inc. at CES Unveiled NYC 2010-BWOne.com. Nov. 2010. [retrieved on Mar. 24, 2013]. Retrieved from the Internet: URL: http://www.youtube.com/watch?v=IVuUCbkYNxA>, entire document (3pp).

* cited by examiner

*Primary Examiner* — Daniel St Cyr
(74) *Attorney, Agent, or Firm* — Blakely Sokoloff Taylor & Zafman

(57) ABSTRACT

An electronic card with a programmable magnetic band which operates to emulate a magnetic stripe on a payment card. The card connects to a smartphone for reducing the amount of cards in a wallet using a NFC protocol. The electronic card with programmable magnetic band includes a magnetic stripe emulator, NFC communication unit, energy harvesting battery management, and high level security. Buttons are used to enter a personal code for using a default card. The card can be used on all payment terminals, and devices that can read magnetic stripes.

24 Claims, 4 Drawing Sheets

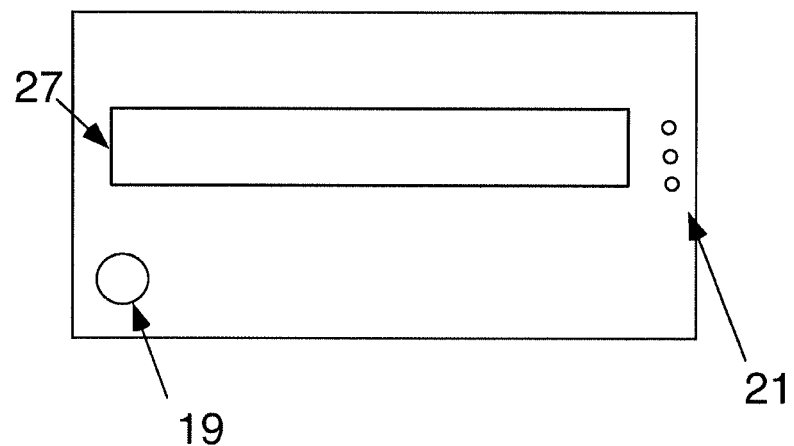
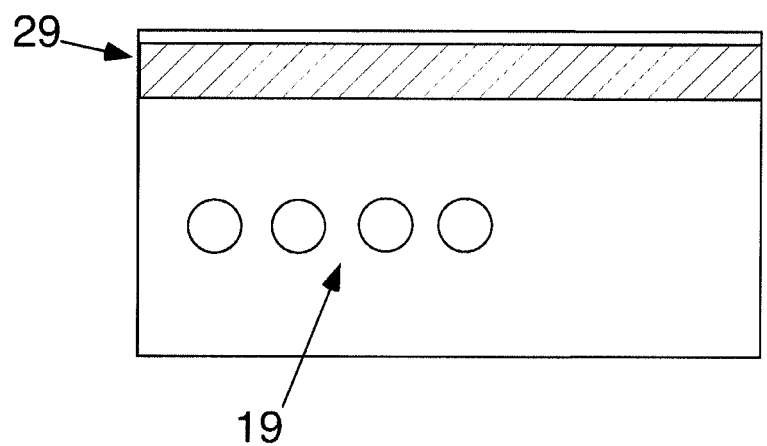

ELECTRONIC CARD WITH A PROGRAMMABLE MAGNETIC STRIPE

BACKGROUND OF THE INVENTION

1. Field of the Invention

The present invention relates generally to an electronic card and more specifically it relates to an electronic card with a programmable magnetic stripe which is programmed by transferring data from a smartphone for reducing the number of debit, credit and other payment cards in a wallet. A near field communication connection (NFC or RFID) is used for transferring data to and from a smartphone.

2. Description of the Prior Art

People typically carry around most of their payment cards such as credit and debit cards in a wallet or purse, and to use a particular card, the desired card is selected and then removed from the wallet or purse. Users want a more convenient way to handle their payment cards, but existing solutions all have problems which limit their use. Some companies have tried to solve this by having users load payment information in their phones and pay with near field communication (NFC), barcodes or other wireless signals using their phone. There are many problems with this. One problem is NFC equipped payment terminals are not in common use in the United States. To make NFC (or other wireless methods) popular, NFC equipped payment terminals would need to be available at substantially every merchant in the U.S. This mass deployment will take years and cost billions of dollars. Also, to use a mobile phone as a payment card substitute, a user would be unable to pay if their phone was unavailable, such as out of battery. Also, since payment terminals in places such as restaurants are usually in a back room area, users would have to give other people (such as waiters at a restaurant) their cell phones if they wanted to pay. Security is also a big problem for traditional payment cards and smartphone payment systems. Lost and stolen wallets contribute to a large percentage of credit card fraud. All of these problems and more are solved with the invention described herein.

BRIEF SUMMARY OF THE INVENTION

The invention is an electronic payment card with a form factor similar to a standard credit card and includes a programmable magnetic stripe. It can replace all payment (credit, debit, gift, etc.) cards which are ordinarily carried by a user in a wallet or purse. A battery on the electronic card used to power devices on the card can be recharged wirelessly. The card has the same dimensions as a normal debit/credit card with all electronics built into the card. Associated with the card is a prior art magnetic stripe reader that can connect to a smart phone. After a user has swiped all their current cards into an application installed on the smart phone using the magnetic stripe reader, the magnetic stripe reader is only needed to add more cards or for purposes unrelated to the invention. Alternatively, information for the card can be manually entered by the user using a smart phone application. To use a particular one of the cards which have been swiped or otherwise entered as described above, the user selects the desired card using a smart phone application, and the phone downloads information pertaining to that card which is stored on a server, and then securely transfers the card data to the electronic card. The programmable magnetic stripe can be programmed so to any existing magnetic stripe reader, the programmed magnetic stripe is identical to the one on the original payment card which was selected by the user.

The device may also store the loaded card information on a secure storage element in the card, a secure storage element in the phone, or both. The device may also store some of the information in a server, some of the information on the phone and some of the information on the electronic card. Since all the information is split up, if one source of the information is compromised, complete credit card data is not exposed since the remaining information needed to make use of the card is still secure.

A user can also press a recall button on the electronic card which automatically loads the last card that was loaded after a personal code is entered provided the electronic card is near the phone which then contacts the server to download the card information.

For most cards, no complete credit card information is permanently stored on the card or phone. However, one of the loaded cards can be designated as a default card which is stored and can be used on payment terminals by accessing buttons (touch sensors) used to enter a personal code. In one embodiment of the card, payment card information is stored in a secure storage element inside the card. This is necessary for situations where the phone cannot contact the server to download the card information for any reason. That is, in this situation, the invented electronic card functions as an ordinary credit card, the only difference being that the personal code must first be entered. Although power is also needed, since the charge in the battery is easily maintained as described herein, loss of power is normally not an issue.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Other advantages of the present invention will become obvious to the reader and it is intended that these objects and advantages are within the scope of the present invention. To the accomplishment of the above, this invention may be embodied in the form illustrated in the accompanying drawings, attention being called to the fact, however, that the drawings are illustrative only, and that changes may be made in the specific construction illustrated and described and still be within the scope of the invention.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 2a and 2b are front and backs view of an electronic card used to implement the present invention showing the buttons, LEDs and magnetic band.

DETAILED DESCRIPTION OF THE INVENTION

Figure 1:
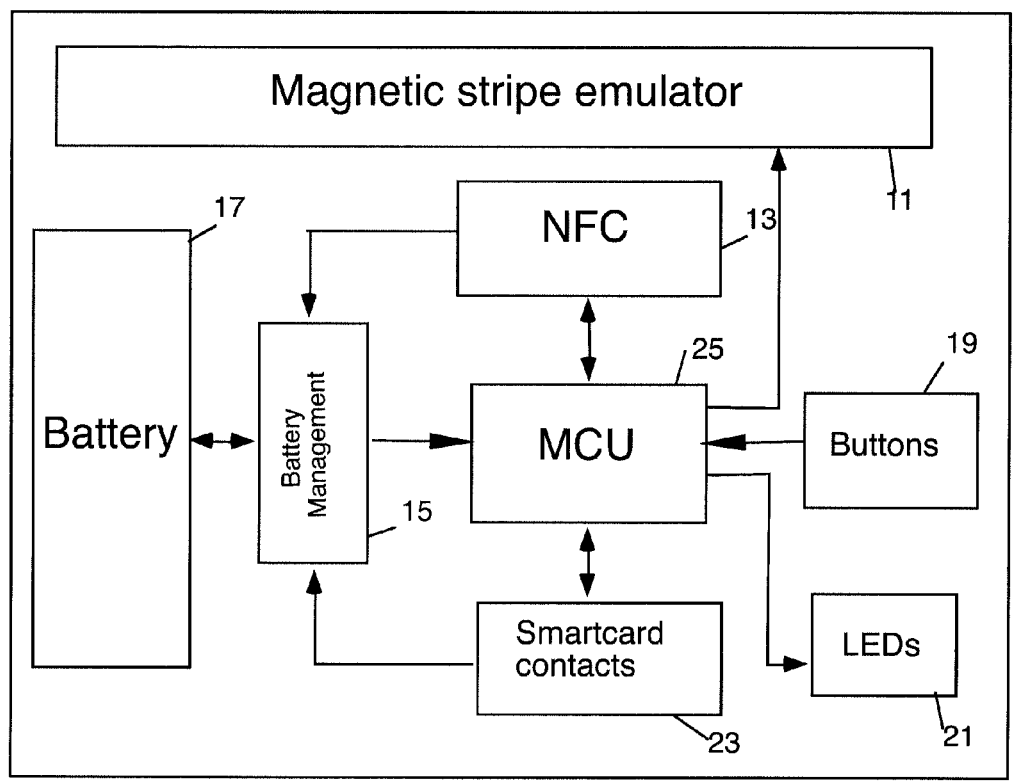
FIG. 1 is a block diagram illustrating the various subsystems forming the present invention.

Turning now descriptively to the drawings, in which similar reference characters denote similar elements throughout the several views, FIG. 1 shows in block diagram form magnetic stripe emulator 11, NFC communication module 13, energy harvesting battery management module 15, battery 17, buttons 19, LEDs 21 and smart card contacts 23.

FIG. 2a shows the front of the card including a button 19 which would typically be a power on/off button, LEDs 21 which are off, blink or solid to display different status as explained below and display 27. FIG. 2b shows the rear of the card with programmable magnetic band 29 which is programmed based on the operation of magnetic stripe emulator 25 and buttons 19 for providing various inputs to the card. Of course, the specific arrangement of buttons, LEDs, and display can vary substantially from that shown in FIGS. 2a and 2b. Each side of the card can have more or fewer buttons, LEDs and displays, and their specific positions can be completely different.

Existing credit cards typically include two magnetic tracks on the stripe referred to as track 1 and track 2. Track 1 is encoded using the International Air Transport Association (IATA) standard. Track 2 is encoded using the American Banking Association (ABA) standard. It is also possible for a card to have only one track or three track. If a third track is present, its format would typically be defined by the issuer. The stripe is strictly delimited where track 1, track 2 and track 3, if present, are located based on the ISO/IEC7811 standard used to define characteristics for many types of identification cards. All tracks are encoded using a technique commonly called Bi-phase mark code (BMC), also defined as part of the ISO/IEC 7811 standard. This encoding allows a magnetic reader to decode the data encoded into the magnetic fields generated when the card is swiped. The magnetic fields decoded using the BMC generate a binary stream of data that represent in digital terms information encoded on the magnetic tracks of the card.

This binary stream is then interpreted to ASCII characters using an algorithm that is defined using a standard for each track of the card, being the IATA standard for track 1 and the ABA standard for track 2. Both are standardized on ISO/IEC 7813 which is used for financial information.

Emulator 11 does this process in reverse. It generates a track represented in ASCII characters based on the user input, then depending of what track is being emulated, it generates a bit stream using one of the IATA or ABA standards. Based on this binary data, the emulator generates an encoded magnetic field using BMC to activate the track's coil when high (binary 1) and deactivating it when low (binary 0).

The magnetic field is generated by running a current through the coil or coils corresponding to track 1 or track 2, turning it on, and off as needed to generate the 0's and 1's. The 1 and 0 (binary data) are generated following the BMC encoding. It can be thought of as a complex Morse code, but instead of using sequences of short and long beeps, sequences of magnetic pulses are used. A group of magnetic pulses can be decoded as a 1234 or BILL SMITH if the correct scheme is followed by the decoder.

The magnetic fields themselves do not change. But the generating current is turned on and off generating a stream of magnetic pulses that can be decoded as data. As previously noted, the pulses are like a complex Morse code in that the beep or pulse is always the same, but strings of pulses represent a different character depending on its length (e.g., long or short) and the other pulses being used in a particular sequence.

Each magnetic track is formed using a coil with one or more sections. Although the coils used provide the magnetic stripe functionality are constructed differently from a typical magnetic stripe seen on a credit card, to a magnetic stripe reader, there is no meaningful difference.

The core of the coil is made of ferromagnetic material, such as permalloy, but other similar metals can be used as well. The core of the coil is wrapped in copper wire or a similar electrically conductive material with at least several hundred turns. The core does not touch the copper directly, as the wire is enameled. Some sections can have a small amount of copper wraps, such as 20, while other sections, such as the main section can have more than 700 wraps. There typically would be two coils to emulate two tracks, but a third coil could be added to emulate a third track.

Figure 3:
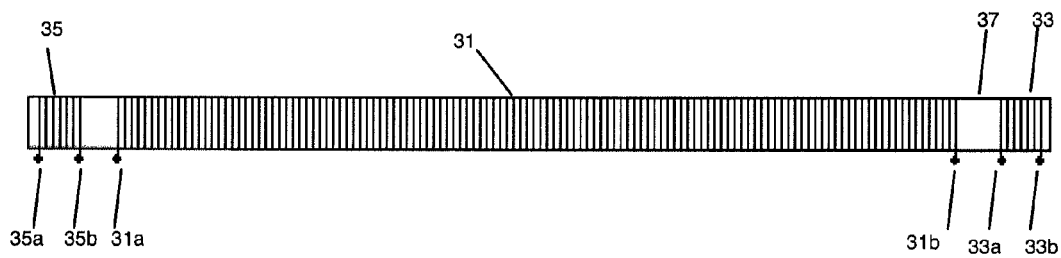
FIG. 3 is a detailed view of coils which form the magnetic band used to function as the magnetic stripe on a traditional payment card.

FIG. 3 shows one such coil having three separate sections or windings 31, 33 and 35 on a single core 37. Each winding has two ends 31a and 31b, 33a and 33b, and 35a and 35b. Each end is connected to a source of power which provides the current needed to generate the necessary pulses to the coil so that when the card is swiped, the magnetic card reader is provided with the necessary information. As described in detail below, emulator 11 is used to generate the necessary signals to produce these pulses. In one embodiment, emulator 11 is created by programming MCU 25 as described below which produces an output which is interfaced using standard circuit elements to generate the current applied to the ends of each winding. Thus, although emulator 11 is shown in FIG. 1 as being separate from MCU 25, which would be the case if a emulator 11 is created as a separate part, in the embodiment as disclosed herein, emulator 11 is part of the programming of MCU 25.

The windings 33 and 35 at both ends of the coil for track 2 are used to detect the magnetic reader. When the card is swiped into a magnetic reader the programming in the MCU senses this movement of the read head using these coils by the Hall effect and then initiates the emulation process.

As noted above, running current through the coil generates a magnetic field. The invention uses the principle of running current through the coil using the BMC algorithm as explained above to generate a valid magnetic track recognizable by all existing readers.

One way to make such a coil would be to use insulated 38AWG copper wire wrapped around the core with about 750 turns for track 1, and for track 2, a central wrap of about 650 turns and two wraps of about 40 turn each one at both extremes as shown in FIG. 3 which represents a single track wherein the coil has three sections.

The core of a soft ferromagnetic material such as permalloy or soft iron with a length of 7.5 cm, a width of 2.5 mm and thickness of 0.3 mm is about the size of a typical credit/debit card magnetic stripe. Preferably, the insulated wire is glued to the core to prevent misalignment. The DC resistance of the coil is 11 Ohms, operating at a frequency 150 kHz to 200 kHz with current up to 20 mA.

Although the core can be made using a soft iron such as pure annealed iron, an alloy commonly referred as permalloy is preferable because it has very high magnetic permeability, which would allow the coil to use less energy per swipe and generate a greater magnetic field, thus allowing readers to obtain a more accurate read.

Battery 17 may be an ultrathin rechargeable lithium polymer battery available from a variety of sources, but other ultra thin batteries could be used as well.

The magnetic stripe emulator 11 and magnetic band 29 on the card mimic the characteristics of a magnetic stripe on a standard payment card using techniques to transmit one or more electromagnetic fields as noted above to couple with a read-head of an electromagnetic reader such a magnetic stripe reader or other methods. The magnetic stripe emulator may detect the presence of a reading device using the magnetic signals emitted by the reader which cause changes in capacitance of coils forming band 29, letting the processor know that the card is placed on a reader so it can emit the expected information encoded as electromagnetic fields. The detector may be one of the coils or any other inductor component. Multiple coils (or other devices) may be provided to help the processor know the kind of device that is reading the card, using this information to modify the electromagnetic field that is about to be emitted to better fit into the reading device.

The emulator is based on Oersted's law that describes the capacity of conductors to create a magnetic field by moving electrical charges on them. All the chips and parts are connected using copper traces or equivalent. They may also be connected using resistors to limit the current flow or capacitors that are used for several reasons such as smoothing the voltage input to the various components on the card. The circuits on the card may also use transistors to control larger current flows that the integrated chips are not able to handle or to control the power source of the entire circuit (battery or directly from the electromagnetic field of the NFC). Some parts are used to provide inductance to the system. Parts may be encapsulated into surface mount device (SMD) packages or directly drawn into the circuit board. They are used to match the resonance required for the contactless communication or for the contactless power charging. The specifics of these interfacing components are not needed for a proper understanding of the invention and are well within the abilities of skilled circuit designers.

All of the card's components interact with other components using copper traces or equivalent. Other than the magnetic card reader, the card itself interacts with external devices such as smart phones using radio signals or equivalent in the 13.56 MHz frequency currently used by RFID or NFC devices. Any other frequency is invisible and harmless to the card because the matching circuit on it is established to resonate at the 13.56 Mhz. Of course, the invention is not limited to this frequency, and other frequencies used by NFC or other wireless devices could also be utilized.

NFC unit 13 is an NFC, energy harvester and communications chip which may be implemented using part PN5120A0HN1 available from NXP Semiconductors. This chip or equivalent chip with NFC/RFID ability or other wireless communication ability is used as a medium to interact with external devices such as cell phones, smart phones and the like and to emulate a contactless bank/ATM/credit (or other) cards. It will react to a NFC device only if it can use a predetermined protocol such as a NFC enabled phone with a properly configured application which has been downloaded and installed on the phone; in any other case, it will just use the energy to charge the battery 17 and nothing more. It may be placed on a charging device which emits an NFC field and it will charge the battery only when it needs it. To charge the card battery, the user needs to place the card near an NFC enabled reader device for some minutes or insert it in a smartcard reader. The card may or may not include smart card contacts 23 which would allow it to be inserted into the smartcard reader to be charged. Although such contacts would be physical contacts on the front, or rear of the card, since such contacts are standard elements and are not needed for a proper understanding of the invention, they are not further described herein. Or the card may include a separate charger that can charge the card with the phone or a charger that can charge the card through an outlet or computer. The charging method may be used in other devices as well.

NFC unit 13 harvests energy from NFC/RFID fields for use by battery 17 which may be implemented using part M24LR16E-RMC6T available from STMicroelectronics or equivalent. NFC unit 13 harvests the energy, filters it and provides an output to be used in the circuit. If the card is outside a predetermined activation timeframe such as eight minutes or other time which begins by the user pressing one or more buttons 19 and it is swiped or inserted on a smartcard reader it will not react. It will react to a NFC device only if it uses a specified protocol. This can be accomplished using a NFC enabled phone with an appropriately configured application loaded. The specifics of such phone application are well known to persons skilled in the art and are not needed for an understanding of the invention. Otherwise, it will just use the energy to charge the battery and nothing more. It may be placed on a charging device which emits an NFC field and it will charge the battery only when it needs it.

Thus, to charge the battery 17, the user needs to place the card near an NFC enabled reader device for some minutes or insert it in a smartcard reader. The specifics of the charging functionality including fault handling and the like are well known in the art.

Battery management unit 15 may be implemented using a SC824ULTRT available from Semtech or equivalent to charge battery 17. If the battery is already fully charged, this chip will provide the energy directly to the rest of the circuits.

Battery management unit 15 receives the energy from the NFC unit 13 and sends it to battery 17 for charging. Battery management unit 15 can also receive energy or signals from the smartcard contacts 23 when available. Thus, when battery management unit 15 has any external source of energy available, it will charge the battery if it required. If the battery does not require a charge, battery management unit 15 will transfer this energy to the rest of the circuit which will not use the battery and use the harvested energy directly.

In one embodiment microcomputer unit (MCU) 25 is implemented using part no. STM32L151C6U6 available from STMicroelectronics or equivalent low power MCU. The MCU handles all the interfaces, stores any required data, performs encryption/decryption, etc. It processes the instructions sent by the external smartphone (or cell phone) application and modifies the card operation. The processor may also have its own application that assists the card to communicate to a phone, other cards, payment devices, and networks. It also may use the information from the buttons and communicate to the LEDs to provide user input and output, have a lockout timer, help with security and more. The specifics of the programming of the MCU are not important for an understanding of the invention and, except for the emulator functionality are well within the abilities of those skilled in the art based on the descriptions provided herein.

All the emulator programming and other data storage requirements can be included in memory within the MCU.

However, external (to the MCU) memory may used to store card information on the card, such as a secure storage element for the default card data.

Figure 4:
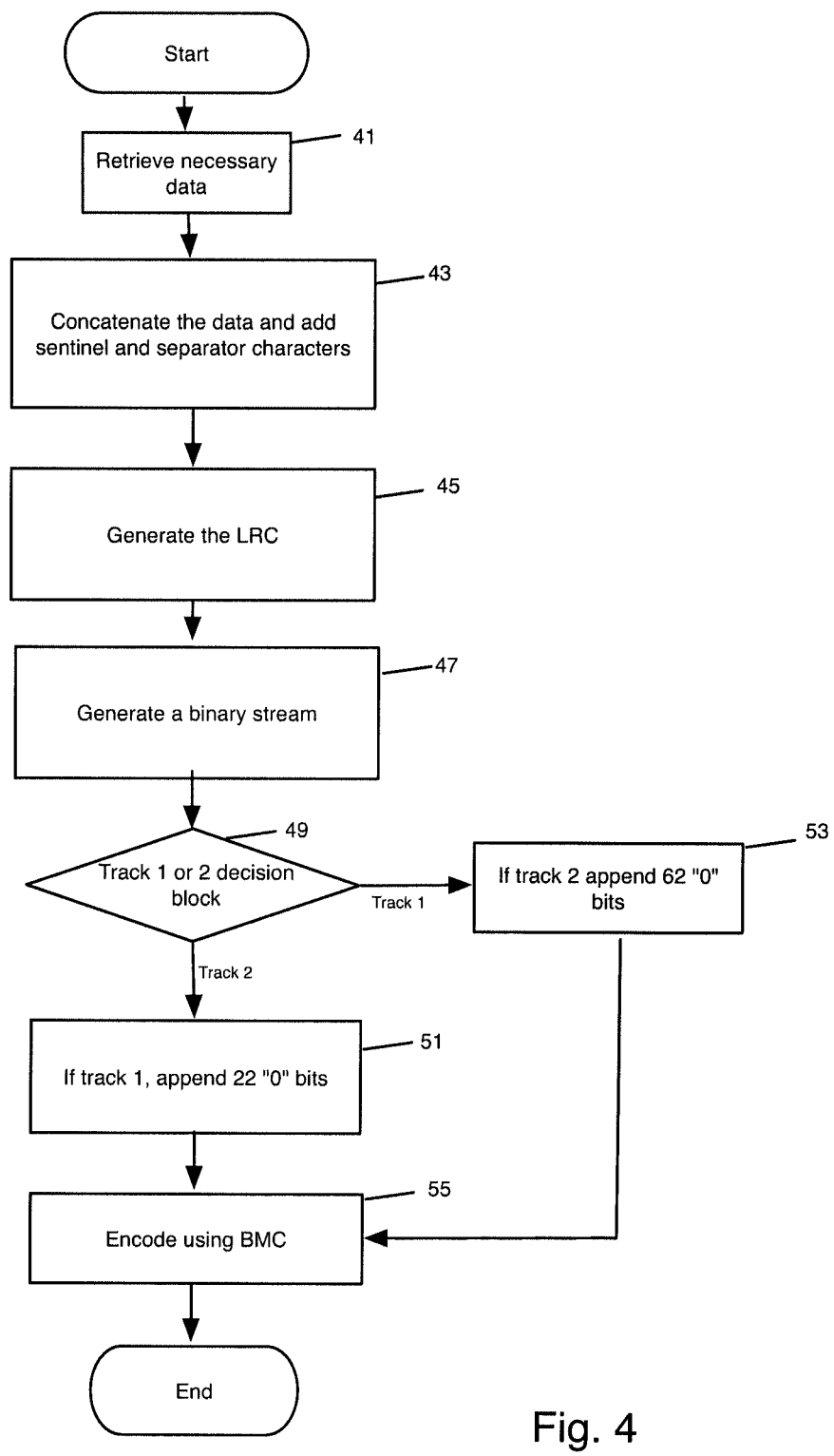
FIG. 4 is a flow chart showing the processing performed by a processor on the electronic card used to generate signals which are sent to the coils to enable the magnetic band to emulate the functionality of the magnetic stripe on a traditional payment card.

Programming for emulator 11 will now be described with reference to FIG. 4.

Retrieve necessary data 41: The data needed to be represented on the magnetic track is stored in multiple locations, such as on a secure server, on the card, from the mobile phone, etc. The necessary data is retrieved from the locations where stored.

Concatenate the data and add sentinel and separator characters 43: The data for a valid track is built from the data retrieved. Typically, the data is in or is converted to ASCII format and concatenated together in the order expected by the reader. The first, separator and last characters on the tracks are always the same and are as defined by the IATA and ABA standards. The first character is called the start sentinel and is usually % for IATA and; for ABA. The last character is called the end sentinel and is usually ? or IATA and ? for ABA. Separator characters are placed between fields such as account number, name, expiration date, etc. The separator characters are usually ^ for IATA and = for ABA. The length and type of data for each field are as specified by the IATA and ABA standards.

Generate the LRC 45: A longitudinal redundancy check (LRC) is a character used to check the integrity of the information on the magnetic track. It is calculated using the other characters being emulated for the track according to well known techniques and is located after the end sentinel character.

Generate a binary stream 47: Track 1 uses IATA standard and track 2 uses ABA standard. Each IATA character is made of 6 bits and each ABA character is made of 4 bits. The specific encoding for each character is as required by the IATA and ABA standards.

Decision block 49—For track 1, append 22 "0" bits 51. For track 2 append 62 "0" bits 53. The BMC encoding needs the zeroes at the start and end to synchronize a clock signal used to enable the data to be decoded when read by a reader.

Encode using BMC 55: As noted above, the specifics of the BMC encoding is based on the ISO/IEC 7813 standard. The binary stream generated by steps 41-53 is encoded using the BMC standard. The resulting stream is applied to the coils for tracks 1 and 2 so that when the coil is sensed by a card reader, it appears to the reader to be a magnetic track of the type used by payments cards so as to emulate the magnetic track for the selected payment card.

During operation, circuits inside the card receive user input from one or more buttons 19 or equivalent placed on the card, and pass the received inputs to MCU 25 for handling. Information is provided to the user using one or more LEDs 21 also placed on the card. The LEDs may also be placed to illuminate the card near the buttons to illuminate the buttons when in a dark location. In one embodiment, text or other messages can be provided by display 27 which may be implemented using a small thin LCD screen, electronic display, e-ink, Electrophoretic display, or electronic ink display. The specific information provided by display 27 is not important for a proper understanding of the invention, but could include items such as images, numbers, text, such as credit card numbers, CVV codes, and network names Visa, MasterCard, and the like. Appropriate programming of MCU 25 would enable display 27 to operate as desired.

To indicate that the reader and card are properly interfacing, an LED will flash during the read operation.

A card functioning according to the invention operates as follows. When the user selects the card to use and enters the unlock password on phone or electronic card via buttons 19, or both, the card will be unlocked for a predetermined period of time such as 8 minutes. After this time, a signal from MCU 25 will erase all sensible data from the card memory (except default card information) and re-lock again. The user can also configure the card to self-lock after a successful transaction. For example, if the card is used on a mobile point of sale device, it will be locked instantly, to avoid cloning scams. Most of the security features are user-configurable, enabling the user to select how secure he/she wants his/her electronic card to be.

The MCU can be programmed to enable to buttons and LEDs to operate in a desired manner so that, for example, pressing one button for a predetermined period of time such as three seconds turns the card on or off, with the LEDs flashing to confirm presses, etc.

The card can transmit data to the phone when it is near the NFC field, so it can report a hack attempt only on that moment. The card has the option to be pin activated, and will lock if the incorrect code is used too many times in a certain timeframe. The electronic card may store a list of transactions that will be transmitted to an application on the phone or other external device. With this information, the user can become aware of the card being read two times on an ATM, meaning that a cloning device may have been used. The user may also use a "recall" option on the card, which transfers the card data that was last on the card from the phone to the card without opening the phone application. The card must still be near the phone for the data transfer. The "recall" option may request a user to type in a code or pin on the card or smart phone application.

The invention may be implemented using a different layout, materials or chips. For example, the LED lights may be in the center of the card that illuminates the see-through portions of the card. The LEDs and touch sensors or buttons can be made of different materials, and may be on different areas of the card with different spacing and more or fewer LEDs or more/fewer touch sensors or buttons.

As previously noted, if the phone of the user is not available to load the card data into the card, a real credit card/debit card called a "default card" can be embedded. Touch sensors (which may be buttons which can be pressed and released or touch sensitive devices) will not allow the user to select several different cards that are already stored on the electronic card. They are used to activate a pin for the card, which then activates the default card. There is also a power button or the like for the card, which turns it on for a set amount of time. The default card could also be a gift card, or a rewards card from a store, or a prepaid card. One could have the default card be a prepaid card that charges users every time they load money onto it. There are several possibilities for the default card: The default card is programmed into the electronic card and can be activated when a user enters a user defined pin using the buttons on the card. For example, the MCU can be programmed so that the user will need to press the a specific one of the buttons for three seconds, or other time period, to wake it up and get electronic card into waiting mode in which case one of the LEDs will flash to indicate that the card is waiting for further input. If nothing is entered within a preset timeframe, the card is placed in idle mode again. If the user enters the code during the allowed period, it will use a secure algorithm to check if it is correct and flash one of the LEDs or, if it is not correct another one of the LEDs is flashed. If the pin is entered wrong three or some other number of times the card will lock itself for a period of time. After that period, and there are further failed pin attempts, the LED becomes solid and the card locks and goes into "fraud alert". The phone application is updated with a fraud alert next time the phone is paired with the card. If a card swipe is detected at a payment terminal, the network notifies the application with a fraud alert protocol.

The default card could be included on the plastic that encapsulates the chips. Display 27 could be used to show numbers representing the card account number of the default account.

All the information transmitted between the card and the application on the phone are encrypted with high standards to avoid "man in the middle" attacks or data leak/manipulation, or other attacks.

The card can mimic most credit/debit/rewards/magnetic stripe cards. A user is provided with a device such as a Square reader available from Square, Inc. that can connect to a smart phone that can read payment cards via a magnetic stripe reader that allows users to "load" or transfer magnetic stripe information to a smart phone (or computer or other device). Alternatively, the user can manually enter the card information using a phone application which stores the entered data in the same manner as if the card had been swiped. The application has many functions described above. The phone then connects to the electronic card and instructs a NFC chip in the phone to connect to NFC unit 13 in the electronic card to transfer card and usage data. The application also instructs the phone to connect to servers to upload/download card and usage information. The application may also connect to other applications in the phone to upload purchases, or a GPS application for location. The application has secure functions so other applications cannot hack into the phone data, or the network.

The phone's camera can be used as a retina scanner. A fingerprint reader can also be incorporated on the card, a phone case, or on the phone. A user may be able to customize how cards are displayed by the phone application; such as which card data can be displayed, which picture is displayed to represent the card, and the layout of the application.

Purchase history may be uploaded when the card is near the phone. For example, "Card swiped at 05:23, Card inserted on dip reader at 06:01, Contactless used at 08:37, etc" (or similar scheme) The phone application will show how many transactions has been made, time of unlocks, stored cards, etc. A computer based application may also be utilized. Of course it will allow recording of the adding and deleting of cards from the Smartphone app. There is also a direct marketing option with the app. The electronic card has the ability to collect a users payment details for added security against card skimmers, but it can be used for advertising purposes as well. A user could be offered an extra reward incentive to allow their entire payment history to be used for advertising purposes.

The phone or card may transmit location of the card, phone, or when the phone is activated to servers or to the user. Specifically, when a user transmits data to the electronic card from the application, the phone location will be recorded. This location will help to determine the current location where the card is being used.

All the data is encrypted with unique codes/keys and sent to a secure server for storage. A unique identifier may be stored on every card, so it is hard to clone or use the user's card if the data is ever leaked from the secure server.

If another electronic card is placed near a user phone it has not been authenticated to, it will be rejected and it will not receive any card information as the unique identifier will not match with the user's card.

When card data is successfully added to the database, the user is able to load this data in the electronic card which can then mimic the original card when desired as described. As noted above, after card data is loaded it will be wiped after a predetermined period of time. If the user wants to load the card data again he/she just need to place the card near his phone. The user would select which card data he would like to load into his electronic card by choosing it on the phone application, and if the card is near the phone, the data will be transferred to the card. The user may also use a "recall" option on the card, which transfers the card data that was last on the one card from the phone to the card without opening the application. The card must still be near the phone for the data transfer.

Information required to emulate the cards will be gathered from customers' cards by using a provided device as described above and security measures employed to avoid using the device to do skimming/fraud/scams. Customers may need to input some data manually. Customers will be required to pass security steps in order to successfully add his/her real card to a device emulation list. There are several possible steps that are optional:

1. Current credit card magnetic stripes have the user's information embedded in the first section of the card. Users may be allowed to upload only cards with only the user's name on the magnetic stripe of the card they are loading. There are several sections of data in magnetic stripes which may be used to verify that a credit card belongs to a correct user.
2. A deposit may be made into, and then subtracted from the credit card account that was just loaded into the network. Then the user is asked to verify the amount to ensure the card account belongs to them.
3. The name on the card may be matched with the current mobile phone account, email or other account to verify the card loaded is the correct card.

All the information stored in the servers, user's device, user's phone/computer, etc. can be encrypted with the strongest algorithm available using private/public keys generated from user input making it near impossible for third parties to get the information from the users' cards if they get access to the data. Most of the data can be stored on the servers. Credit card information from the servers may be paired with partial credit card information stored on the phone.

The card may be manufactured many ways, and can be manufactured to give the card many different appearances. One method is to laminate the chips, battery and magnetic emulator (i.e., cover with plastic film). The lamented configuration could then be surrounded by melted plastic (PVC, etc.), to make it look more like a common credit card. The chip configuration could be encapsulated in two (or more or less) kinds of plastic to give it an appearance similar to a normal magnetic stripe card. Two different types of plastic, one clear, one another color (or clear) could be pre-molded to encapsulate the card (i.e., two thin pieces of plastic would be hollow). The edges of where the two pre-molded pieces of plastic meet could be soldered together. The two pieces of plastic could also clip, or connect together without needing soldering. For example one of the pieces of pre-molded plastic would have small pieces that are extended at the edge to go into the other premolded plastic that had holes or grooves for the small pieces enter. The two pieces could also meet at a light that also serves as an anchor to hold the two pieces together and also immuninate the clear portion of the outside mold. Also, clear PVC or other encapsulating material could be applied to the chips and battery in layers.

We claim:

1. A system for performing credit card and debit card transactions comprising:
   a) a card having a predetermined form factor;
   b) a battery unit disposed on said card;

c) a near field communications unit disposed on said card;
d) a magnetic stripe emulator disposed on said card;
e) at least one programmable magnetic band disposed on said card;
f) a microcomputer unit disposed on said card;
g) at least one button disposed on said card;
h) a memory disposed on said card for storing transaction card data used for performing said transactions, wherein said data is stored in said memory by operation of said near field communications unit communicating with a mobile device;
i) a pair of detectors disposed on said card adjacent to said at least one programmable magnetic band,
wherein said detectors are configured to detect a magnetic reader read head by a generated Hall effect,
wherein said battery supplies power to said microcomputer unit which is electrically coupled to said near field communications unit, and said at least one button,
said microcomputer unit is configured to operate said magnetic stripe emulator to send signals representing said card data to said at least one programmable magnetic band and to operate said near field communications unit based on signals received from said at least one button and said near field communications unit, and
said signals are sent to said at least one programmable magnetic band for generating a desired set of magnetic pulses by said at least one programmable magnetic band.

2. The system defined by claim 1 further comprising a display for displaying at least one of images, text, and numbers based on operation of said at least one button and microcomputer unit.

3. The system defined by claim 1 further comprising at least one LED for displaying status information based on operation of said at least one button and microcomputer unit.

4. The system defined by claim 1 further comprising a set of contacts disposed on said card for receiving energy from an external charging device.

5. The system defined by claim 4 comprising a battery management unit disposed on said card configured to receive energy from at least one of said near field communications unit and said contacts and send said received energy to said battery for charging said battery.

6. The system defined by claim 1 wherein said at least one programmable magnetic band comprises at least one coil formed by a ferromagnetic core and at least one electrically conductive wire having anon-conductive coating wrapped around said core.

7. The system defined by claim 1 wherein said magnetic stripe emulator operates to emulate a track represented in ASCII characters, and generates a bit stream using one of an IATA and ABA standard which generates an encoded magnetic field using said programmable magnetic band.

8. The system defined by claim 1 wherein said microcomputer unit is configured to:
retrieve data needed to be represented on the magnetic track from at least one of a remote server, a local memory, a mobile device coupled to the near field communications unit;
concatenate the retrieved data and add sentinel and separator characters;
generate a longitudinal redundancy check (LRC) using the other characters being emulated to be represented on the magnetic track;
generate a binary stream using at least one of an IATA standard and an ABA standard; append a plurality of "0" bits to the binary stream for synchronization;
encode the binary stream generated using Bi-phase (BMC) endoding;
send said encoded signals to said at least one programmable magnetic band for generating said desired set of magnetic pulses.

9. A method for performing credit card and debit card transactions comprising:
a) generating signals for emulating a magnetic stripe of the type used on credit cards and debit cards by operation of a microcomputer disposed on a card having a predetermined form factor for use as at least one of a debit card and credit card;
b) sending said generated signals to at least one programmable magnetic band disposed on said card;
c) generating a desired set of magnetic pulses using said generated signals sent to said at least one programmable magnetic band;
d) detecting a magnetic reader read head by a generated Hall effect produced by a pair of detectors disposed adjacent to said programmable magnetic band;
e) providing power used by said microcomputer and said at least one programmable magnetic band by a battery unit disposed on said card;
f) said microcomputer unit configured to operate said magnetic stripe emulator by sending said signals to said at least one programmable magnetic band and a near field communications unit disposed on said card based on signals received from at least one button disposed on said card and said near field communications unit, wherein said signals correspond to transaction card data used for performing said transactions.

10. The method defined by claim 9 further comprising displaying at least one of images, text, and numbers based on operation of said at least one button and microcomputer unit.

11. The method defined by claim 9 further displaying status information using at least one LED based on operation of said at least one button and microcomputer unit.

12. The method defined by claim 9 further comprising receiving energy from an external charging device from a set of contacts disposed on said card.

13. The method defined by claim 12 further comprising receiving energy from at least one of said near field communications unit and said contacts using a battery management unit disposed on said card and sending said received energy to said battery for charging said battery.

14. The method defined by claim 9 wherein said at least one programmable magnetic band comprises at least one coil formed by a ferromagnetic core and at least one electrically conductive wire having a non-conductive coating wrapped around said core.

15. The method defined by claim 9 wherein said magnetic stripe emulator operates by emulating a track represented in ASCII characters, and generating a bit stream using one of an IATA and ABA standard which generates an encoded magnetic field using said programmable magnetic band.

16. The method defined by claim 15 wherein said at least one programmable magnetic band comprises at least one coil formed by a ferromagnetic core and at least one electrically conductive wire having a non-conductive coating wrapped around said core.

17. The method defined by claim 15 wherein said magnetic stripe emulator operates by emulating a track represented in ASCII characters, and generating a bit stream using one of an IATA and ABA standard which generates an encoded magnetic field using said programmable magnetic band.

18. The method defined by claim 15 wherein said magnetic stripe emulator operates by retrieving data needed to be represented on the magnetic track from at least one of a remote server, a local memory, and a mobile device;
concatenating the retrieved data and adding sentinel and separator characters;
generating a longitudinal redundancy check (LRC) using the other characters being emulated to be represented on the magnetic track;
generating a binary stream using at least one of an IATA standard and an ABA standard;
appending a plurality of "O" bits to the binary stream for synchronization;
encoding the binary stream generated using Bi-phase (BMC) encoding;
sending said encoded signals to said at least one programmable magnetic band for generating said desired set of magnetic pulses.

19. A system for performing credit card and debit card transactions comprising:
a) a magnetic stripe emulator;
b) at least one programmable magnetic band electrically coupled to said emulator for generating a desired set of magnetic pulses;
wherein said magnetic stripe emulator is configured to send signals to said at least one programmable magnetic band to generate said desired set of magnetic pulses which are for communicating with a transaction terminal used to perform credit card and debit card transactions, wherein ear field communications unit is used to communicate with a mobile device to obtain data needed for performing said credit card and debit card transactions;
c) a pair of detectors disposed on said card adjacent to said at least one programmable magnetic band,
d) wherein said detectors are configured to detect a magnetic reader read head by a generated Hall effect.

20. The system defined by claim 19 wherein said at least one programmable magnetic band comprises at least one coil formed by a ferromagnetic core and at least one electrically conductive wire having a non-conductive coating wrapped around said core.

21. The system defined by claim 19 wherein said magnetic stripe emulator operates to emulate a track represented in ASCII characters, and generates a bit stream using one of an IATA and ABA standard which generates an encoded magnetic field using said programmable magnetic band.

22. The system defined by claim 19 wherein said signals comprise:
a binary stream using at least one of an IATA standard and an ABA standard;
a plurality of "O" bits appended to the binary stream for synchronization, wherein said binary stream is generated using Bi-phase (BMC) encoding and are provided to said at least one programmable magnetic band for generating said desired set of magnetic pulses.

23. The system defined by claim 19 wherein said magnetic stripe emulator is configured to: retrieve data needed to be represented on the magnetic track from at least one of a remote server, a local memory, and a mobile device;
concatenate the retrieved data and add sentinel and separator characters;
generate a longitudinal redundancy check (LRC) using the other characters being emulated to be represented on the magnetic track;
generate a binary stream using at least one of an IATA standard and an ABA standard;
append a plurality of "O" bits to the binary stream for synchronization;
encode the binary stream generated using Bi-phase (BMC) endoding;
send said encoded signals to said at least one programmable magnetic band for generating said desired set of magnetic pulses.

24. A method for performing credit card and debit card transactions comprising:
a) generating signals for emulating a magnetic stripe of the type used on credit cards and debit cards for use as a functional equivalent of at least one of a debit card and credit card;
b) sending said generated signals to at least one programmable magnetic band;
c) detecting a magnetic reader read head by a generated Hall effect produced by a pair of detectors disposed adjacent to said programmable magnetic band;
d) generating a desired set of magnetic pulses using said generated signals sent to said at least one programmable magnetic band,
e) communicating using a near field communications unit to communicate with a mobile device to obtain data used to generate said signals.

* * * * *

UNITED STATES PATENT AND TRADEMARK OFFICE
CERTIFICATE OF CORRECTION

PATENT NO. : 8,820,649 B2
APPLICATION NO. : 14/022123
DATED : September 2, 2014
INVENTOR(S) : Jordan Chandler Goldman, Daniel Anthony Auten and Carlos Pizarro Leon It is certified that error appears in the above-identified patent and that said Letters Patent is hereby corrected as shown below:

In the Claims,

Column 11, Claim 6, line 47, please delete "anon-conductive" and insert --a non-conductive--.

Column 12, Claim 8, line 2, please delete "endoding" and insert --encoding--.

Column 13, Claim 19, line 28, please delete "wherein ear" and insert --wherein a near--.

Signed and Sealed this
Seventh Day of April, 2015

Michelle K. Lee
*Director of the United States Patent and Trademark Office*